Nov. 15, 1966  H. P. VAN GRONINGEN  3,286,010
PROCESS FOR SEALING TUBES
Filed April 23, 1963  2 Sheets-Sheet 1
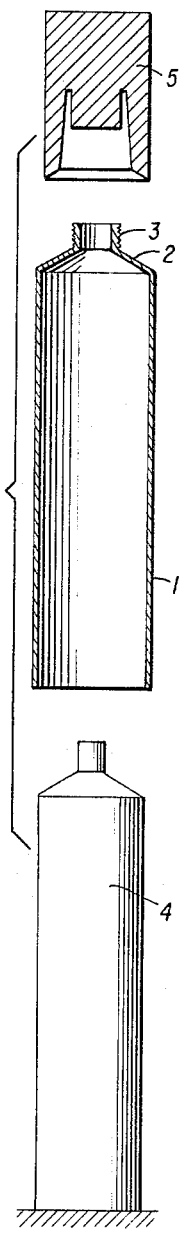
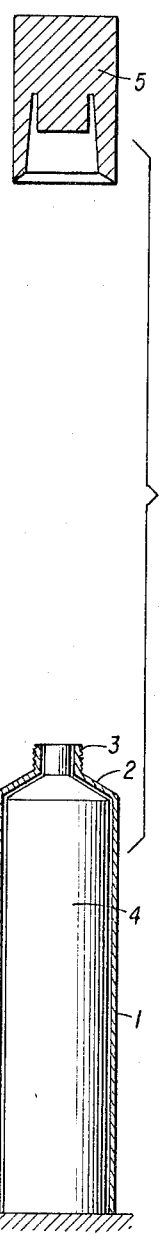
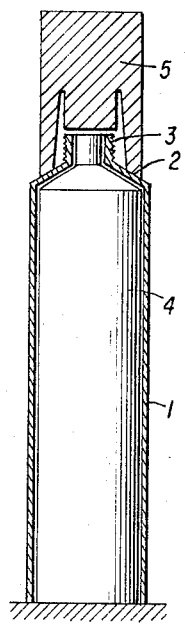
INVENTOR
HENRI POPKO VAN GRONINGEN Nov. 15, 1966 H. P. VAN GRONINGEN 3,286,010
PROCESS FOR SEALING TUBES Filed April 23, 1963 2 Sheets-Sheet 2

INVENTOR
HENRI POPKO VAN GRONINGEN

United States Patent Office 3,286,010
Patented Nov. 15, 1966

3,286,010
PROCESS FOR SEALING TUBES
Henri Popko van Groningen, Essendonkstraat 6, Essen, near Antwerp, Belgium
Filed Apr. 23, 1963, Ser. No. 275,027
Claims priority, application Belgium, May 18, 1962, 617,812
3 Claims. (Cl. 264—242)

This invention relates to the sealing of tubular elements opened at both ends and more particularly tubes of light and deformable material, completely open at one end and having at the other end a tapered head extended by an axially bored bushing which is generally threaded on the outside.

These deformable tubes are conventionally used for packing pasty, viscous, semi-liquid or liquid substances or products.

These tubes are also usually closed by a plug screwed on the said bushing before filling the tube.

It is an object of the invention to provide a novel process for reducing the cost and increasing substantially the yield in the production of such tubes with respect to the economic point of view from the manufacture to the filling.

For this purpose, one of the objects of the invention is to avoid firstly the screwing or securing operation of the plug or seal on the end bushing of one of the tube ends. The resulting saving is substantial, since this operation is conventionally carried out usually either by hand or by means of automatic screwing machines. Thus, in spite of the simplicity of this operation and the possibility of using not particularly skilled workmen, there is avoided an operation limiting the production rhythm in the operating cycle of the manufacture of such filled tubes.

It should be also considered that, although the said screwing operation is itself very simple, the tube being gripped and sealed is relatively very brittle, so that, in spite of its simplicity, this production step requires special care, which is avoided by the process according to the invention.

Another object of this novel process is to prevent a tube manufacturer from depending upon a plug manufacturer with the resulting shortcomings, such as a higher price, delivery times and all the drawbacks which could result from defects, from a bad selection of the raw material or from the obligation for the tube manufacturer to conform with the seal standards. Still another object is to provide a tight closure. Finally, another object of the invention is to avoid the use of cork gaskets or any other related material, these elements being disposed in the plugs during the manufacture.

For the realization of these objects and the substantial comfort and savings resulting therefrom, the process of the invention comprises substantially realizing the deformable tube by the conventional processes and means, sealing temporarily the bushing extending the usual tapered head in the case of a tube with an opened bushing, supporting firmly the said tube on all its portions, moulding directly the plug or seal on the said bushing and finally removing the temporary support and the moulding means from the tube, thereby providing a usual and normally closed tube.

More particularly in the case of a tube with an opened bushing, according to a prevalent feature of the invention, the support of the tube is provided during the moulding of the plug or seal so as to form simultaneously the temporary sealing means of the tube.

For this purpose, the said support is shaped to conform with the shape and the sizes of the hollow portions of the tube in such manner that by merely disposing the tube on the support, both the complete sealing and the firm support in any point are provided.

Although the direct moulding of the plug or seal on the bushing of the tube may be carried out by any known means, the injection moulding will be generally used. The materials used for this purpose will be similar to those generally used for the manufacture of such plugs or seals.

Nevertheless, it is suggested to use as far as possible resins having some resilience to make the subsequent separation between the tube and its plug easier.

For readiness and production rhythm purposes, the seals or plugs will be generally selected from those stripped directly by a simple axial translation movement without requiring laterally moving screw mould or core.

For this purpose, there are generally selected tapered, truncated, pyramidal plugs or the like having a continuous surface and such a batter that the stripping is made as easy as possible. In fact, it should be noted that the process of the invention is mainly intended for being used with a relatively rapid production rate by fully automatic means.

This process may be completed by any additional operation or step in accordance with the concerned tube and/or seal. On the other hand, the said process may be used in widely variable apparatuses or machines in accordance with the used moulding process or machine and according to the means used for supporting and sealing temporarily the tubes and for feeding the said moulding machine, all of which are covered by this invention, provided the process described therein is used.

Thus, it is only by way of example and without any limitation that an embodiment of a tube opened at both ends will be described hereafter with further details, with reference to the enclosed drawings, wherein:

FIGURES 1 to 6 show diagrammatically the successive steps of a complete operating cycle in an embodiment of the process of the invention;

Figure 4:
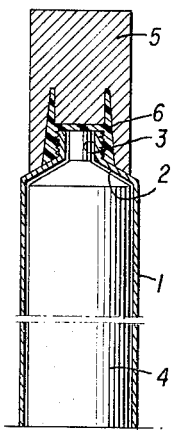
Figure 5:
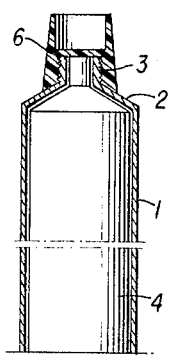
Figure 6:
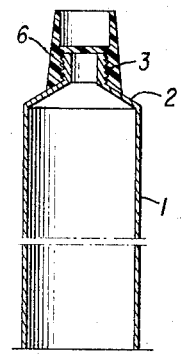
Figure 7:
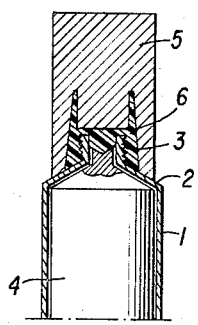
FIGURES 7 to 11 show diagrammatically radial sections of other seals which may be realized by using the process of the invention.
Figure 8:
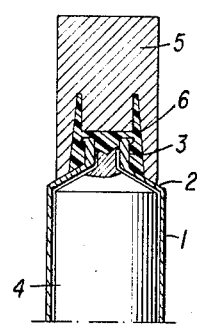
Figure 9:
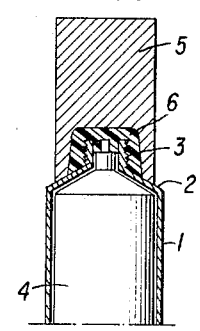
Figure 10:
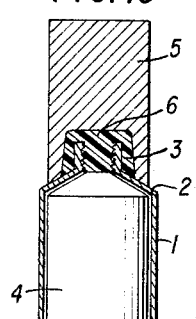
Figure 11:
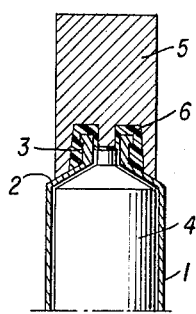

In the diagrammatic views of FIGURES 1 to 6, 1 shows a deformable tube shaped as usual and extended at one end by a truncated head 2, which is in turn extended by a bushing 3, threaded on the outside. 4 represents a support which may also form a provisional seal. The mould or injection head is shown as diagrammatically as possible by 5, this diagrammatic figure being only intended to describe the successive steps of an operating cycle. That is why the said mould or injection head does not show the conduits for feeding the material or removing air nor the actuating members. The seal is indicated by 6 and has a shape known per se. Thus the process comprises (FIG. 2) adjusting a tube 1-2-3 on the support 4 in such manner that the said tube is positively supported on all its portions and is automatically closed, covering (FIG. 3) the head 2-3 of the tube 1 with the mould or injection head 5 by causing a relative translation movement between the support 4 and the said mould or injection head, injecting (FIG. 4) the plastic material in the conventional manner into the mould or injection head 5 to fill up the space between the said mould 5 and the said head 2-3 of the tube 1, separating the mould or injection head 5 from the said tube head 2-3 to free the seal 6, which is correctly adjusted in closing position on bushing 3 and the underlying portion of the truncated head 2 (FIG. 5), and then separating the tube 1-2-3-6 from the support 4 (FIG. 6).

The embodiments of FIGURES 7 to 11 employ all the above described elements, excepted that the configuration of the bushing 3 and the shape of the seal 6 are modified independently of the features of the process. These modifications may be multiplied indefinitely.

This process may be carried out by very different means either as a manual or semi-automatic or automatic unit.

Figure 12:
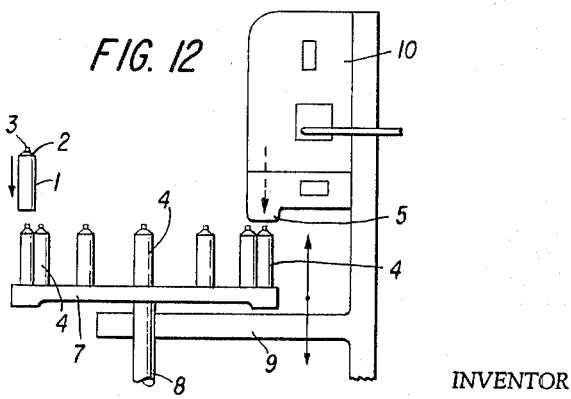
FIG. 12 shows as diagrammatically as possible the essential elements of a machine, in which the process of the invention may be used.

Only by way of example, FIGURE 12 shows very diagrammatically a machine allowing a production at a rapid rate with reduced labour.

This diagrammatic view shows again the supports 4 distributed along the periphery of a rotating plate 7 mounted on an axis 8 engaged by the frame 9 of the machine. This frame bears also the injection machine 10, the head 5 of which is disposed above and at a suitable distance from the crown outlined by the said supports 4. The plate 7 may be raised and lowered to bring nearer and to space the injection head 5 and the co-axial support 4 respectively to and from each other. Thus, it is sufficient to provide the said plate 7 with a step by step rotating means for securing every time a support 4 co-axially with respect to the injection head 5. In this way, an operator at the opposite point of the plate 7 with respect to the said injection head may successively dispose a tube 1-2-3 on each of the said supports 4 or remove such tube provided with a seal 6 from each of the said supports 4.

What I claim is:

1. A process for sealing a deformable hollow tube having an open end and a head provided with screw threads, said process comprising the steps of firmly mounting the tube upon a support, sealing said head, covering said head with a mold, whereby said mold constitutes a temporary seal for said head and said head constitutes a core for said mold, a space being provided between said head and said mold, filling said space with a molding composition to form a cap upon said head, removing said mold and removing the tube carrying the cap from said support.

2. A process in accordance with claim 1, wherein the tube remains upon the support during the removal of said mold due to frictional strain between the tube and the support.

3. A process in accordance with claim 1, wherein the tube remains upon the support during the removal of said mold due to an axial strain exerted upon said tube by said support.

References Cited by the Examiner
UNITED STATES PATENTS

| | | | |
|---|---|---|---|
| 1,754,496 | 4/1930 | Barker. | |
| 2,086,939 | 7/1937 | Hess | 264—36 |
| 2,347,737 | 5/1944 | Fuller | 264—242 |
| 2,778,533 | 1/1957 | Savary. | |
| 2,794,574 | 6/1957 | McGeorge. | |
| 2,904,845 | 9/1959 | Sperry | 264—242 |
| 2,945,266 | 7/1960 | Mainardi. | |

ROBERT F. WHITE, *Primary Examiner.*

ALEXANDER H. BRODMERKEL, *Examiner.*

F. MARLOWE, L. S. SQUIRES, *Assistant Examiners.*